(12) United States Patent
Lee et al.

(10) Patent No.: US 9,581,617 B2
(45) Date of Patent: Feb. 28, 2017

(54) APPARATUS FOR SCANNING NANO STRUCTURE WITH PLURAL AFM PROBES AND METHOD THEREOF

(71) Applicant: Korea Advanced Institute of Science and Technology, Daejeon (KR)

(72) Inventors: Jhinhwan Lee, Daejeon (KR); Donghyeon Son, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/981,705

(22) Filed: Dec. 28, 2015

(65) Prior Publication Data

US 2016/0231351 A1 Aug. 11, 2016

Related U.S. Application Data

(63) Continuation of application No. PCT/KR2015/012943, filed on Nov. 30, 2015.

(30) Foreign Application Priority Data

Feb. 11, 2015 (KR) .................. 10-2015-0020674

(51) Int. Cl.
*G01Q 60/24* (2010.01)
*G01Q 70/06* (2010.01)
*G01Q 60/38* (2010.01)
*G01Q 80/00* (2010.01)

(52) U.S. Cl.
CPC ............. *G01Q 70/06* (2013.01); *G01Q 60/38* (2013.01); *G01Q 80/00* (2013.01)

(58) Field of Classification Search
CPC ........ G01Q 10/00; G01Q 10/02; G01Q 10/04; G01Q 60/00; G01Q 60/24
USPC ......................................... 850/1, 2, 3, 21, 33
See application file for complete search history.

(56) References Cited

U.S. PATENT DOCUMENTS

| | | | | |
|---|---|---|---|---|
| 6,011,261 A | * | 1/2000 | Ikeda | B82Y 35/00 216/11 |
| 6,278,113 B1 | * | 8/2001 | Murayama | B82Y 35/00 250/442.11 |
| 7,765,607 B2 | * | 7/2010 | Faris | B82Y 35/00 850/52 |
| 8,141,168 B2 | * | 3/2012 | Nakayama | B82Y 35/00 73/104 |

(Continued)

FOREIGN PATENT DOCUMENTS

| | | |
|---|---|---|
| JP | H07-229906 A | 8/1995 |
| JP | 2002-139414 A | 5/2002 |

(Continued)

OTHER PUBLICATIONS

Office Action for Korean Patent Application No. KR 10-2015-0020674, Apr. 15, 2016, 7 Pages.
Search Report for PCT/KR2015/012943, Mar. 28, 2016, 4 Pages.

*Primary Examiner* — Nicole Ippolito
(74) *Attorney, Agent, or Firm* — Fenwick & West LLP

(57) ABSTRACT

Plural AFM probes with different resolutions are implemented on an apparatus for scanning a nearly free-standing nanometer-scale specimen. The apparatus identifies the location and the shape of the nano structure on a specimen piece using a high resolution AFM probe, and then measures a three-dimensional shape of the identified nano structure using an atomic resolution AFM probe.

19 Claims, 19 Drawing Sheets

(56) References Cited

U.S. PATENT DOCUMENTS

| | | | |
|---|---|---|---|
| 2002/0063213 A1 | 5/2002 | Itsuji et al. | |
| 2005/0269035 A1* | 12/2005 | Kawakami | B82Y 35/00 |
| | | | 156/598 |
| 2006/0032296 A1 | 2/2006 | Hare et al. | |
| 2007/0289369 A1 | 12/2007 | Wang et al. | |
| 2012/0027947 A1* | 2/2012 | Espinosa | B81C 1/00111 |
| | | | 427/526 |

FOREIGN PATENT DOCUMENTS

| | | |
|---|---|---|
| JP | 2002-228572 A | 8/2002 |
| JP | 2011-215112 A | 10/2011 |
| KR | 10-0679620 B1 | 2/2007 |
| KR | 10-1347557 B1 | 1/2014 |

\* cited by examiner

Absorption spectra for various gases
(Peixoto and Oort, 1992)

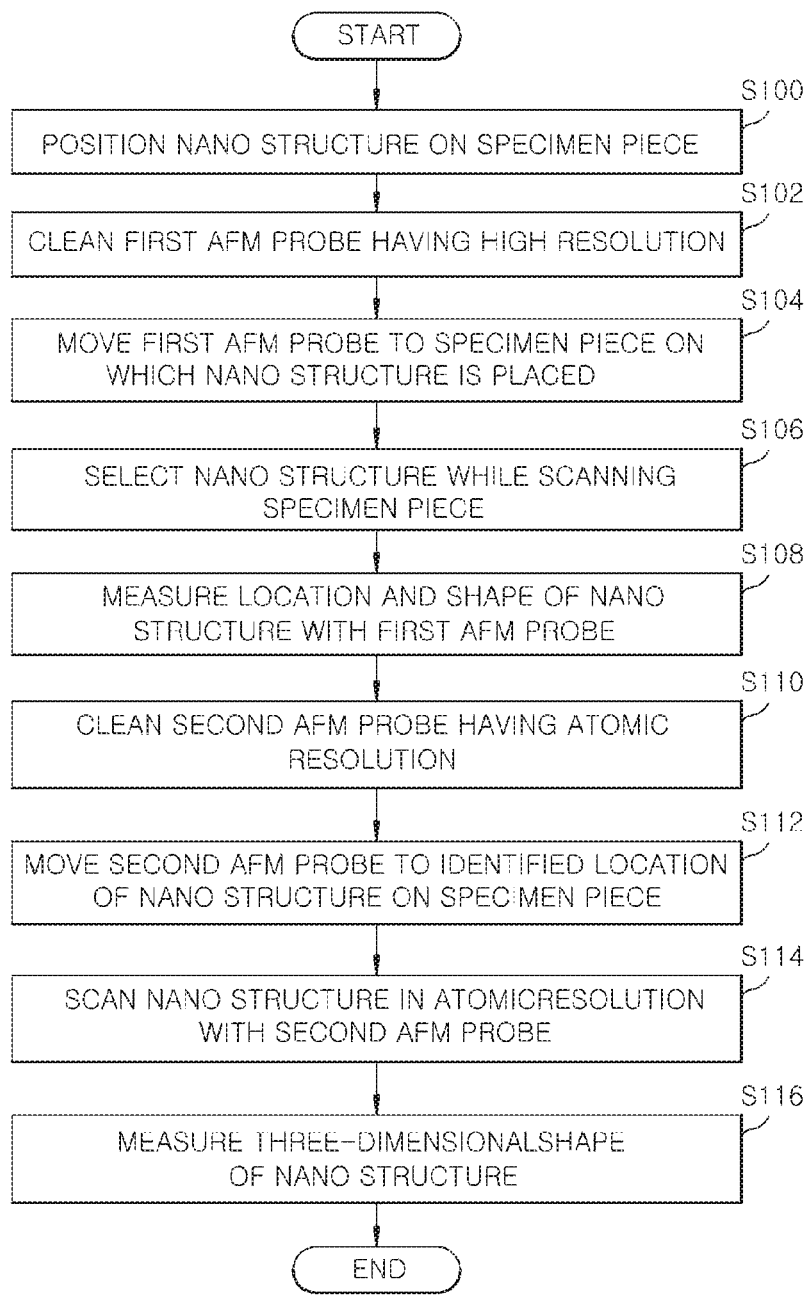

APPARATUS FOR SCANNING NANO STRUCTURE WITH PLURAL AFM PROBES AND METHOD THEREOF

CROSS-REFERENCE TO RELATED APPLICATIONS

The present application is a continuation of International Patent Application No. PCT/KR2015/012943, filed Nov. 30, 2015, which is based upon and claims the benefit of priority to Republic of Korea Patent Application No. 10-2015-0020674, filed on Feb. 11, 2015. The disclosures of the above-listed applications are hereby incorporated by reference herein in their entirety.

FIELD OF INVENTION

The disclosure relates to an atomic force microscope (AFM) measurement method for a nearly free-standing nano structure, more particularly to an apparatus and a method for scanning nano structure with plural AFM probes. Plural AFM probes with different resolutions are implemented on an apparatus for scanning a nano structure. The apparatus identifies the location and the shape of the nano structure on a specimen piece using a high resolution AFM probe. Then, the apparatus measures a three-dimensional shape of the identified nano structure using a second AFM probe with atomic resolution, and thereby enables more precise and complete measurement on a nano structure.

BACKGROUND OF THE INVENTION

Recently, microstructures with micro or nano scales are used for a micro electro mechanical system (MEMS), a micro electronic device, a photo-electronic device, or the like. To design and manufacture such devices, it is required to identify the shapes of the microstructures used for the devices and to test the mechanical properties of the microstructures.

Generally, an atomic force microscope, i.e., AFM, was developed to measure the surface shape of a specimen piece of microstructures. As it has been realized that an AFM can be utilized for a high resolution test on a micro load and displacement of a microstructure, however, it additionally provides a function for testing mechanical properties, e.g., a nano-indentation test function.

As an AFM additionally provides a nano-indentation test, it can measure mechanical properties such as elastic modulus or hardness of a microscale specimen piece that was not measurable with any existing testing device.

However, most of conventional devices for scanning a nano structure using AFM probes merely have a single AFM probe with a fixed resolution, and thus, they have problems that they are incapable of measuring a nano structure with various resolutions and, as they use a single AFM probe, the AFM probe can be easily contaminated by impurities during operations such as rotating or rolling the nano structure to the right orientation.

Prior Art Reference

Korean Registered Patent No. 10-0679620 (Registered on Jan. 31, 2007)

SUMMARY OF INVENTION

In accordance with the technological goals mentioned above, there is provided an apparatus and a method for scanning nano structure with plural AFM probes. Plural AFM probes with different resolutions are implemented on an apparatus for scanning a nano structure. The apparatus identifies the location and the shape of the nano structure on a specimen piece using a high resolution AFM probe, and then measures a three-dimensional shape of the identified nano structure using the second AFM probe with atomic resolution, and thereby enables more precise complete measurement on a nano structure.

The apparatus for scanning nano structure with plural AFM probes comprises a specimen piece on which a nano structure is placed, a probe part having plural AFM probes with different resolutions and a motor part being coupled to the specimen piece or the probe part, for moving the specimen piece or the probe part in a horizontal direction.

Further, the probe part is characterized by comprising a first AFM probe for performing a first measurement on the nano structure to measure a location and a shape of the nano structure on the specimen piece, and a second AFM probe, being spaced from the first AFM probe by a predetermined distance, for performing a second measurement on the nano structure to measure a three-dimensional shape of the nano structure with atomic resolution.

Further, the probe part is characterized by scanning the specimen piece using the first AFM probe to select the nano structure, and re-scanning the nano structure while rotating the nano structure in a requested direction or adjusting a binding molecule layer supporting the nano structure to measure the location and the shape of the nano structure.

Further, the probe part is characterized by, when adjusting the binding molecule layer, irradiating, through a laser irradiation apparatus, a laser with a particular wavelength corresponding to an electronic excitation energy or a vibration frequency of binding molecules which constitute the binding molecule layer to selectively adjusting the thickness and the smoothness of the binding molecule layer.

Further, the laser irradiation apparatus is characterized by being positioned outside of the first AFM probe, or positioned inside of the first AFM probe as being provided in a form of a near-field scanning optical microscope.

Further, when identifying the location and the shape of the nano structure through the first AFM probe, the probe part is configured to move the second AFM probe to the location of the nano structure, and scan the nano structure in an atomic resolution using the second AFM probe to measure the three-dimensional shape of the nano structure.

Further, in moving the second AFM probe to the location of the nano structure, the probe part is configured to move the second AFM probe to a location at which a second location relation image matches with a first location relation image, wherein the first location relation image between the first AFM probe and the nano structure is photographed by an optical microscope, and thereafter, the second location relation image between the second AFM probe and the nano structure is photographed by the optical microscope while approaching the second AFM probe to the nano structure.

Further, the probe part is characterized by further comprising the first motor moving a first AFM probe in a vertical direction and the second motor moving a second AFM probe in a vertical direction, wherein when performing the first measurement or the second measurement, the system respectively moves the first AFM probe or the second AFM probe through the first motor or the second motor onto the specimen piece to a height required for measuring the nano structure.

Further, the probe part is characterized by further comprising a scanner coupled to each of the first AFM probe and the second AFM probe, for generating a scanned image of the nano structure measured through the first AFM probe and the second AFM probe.

Further, the first AFM probe is characterized by having a high resolution and the second AFM probe is characterized by having an atomic resolution.

Further, the scanning apparatus is characterized by further comprising a calibration part for performing calibration of a relative position between the first AFM probe and the second AFM probe prior to an actual measurement on the nano structure.

Further, in performing the calibration, the calibration part measures a particular location of the nano structure with the first AFM probe and a first image is photographed to be a reference, and then, the second AFM probe is moved based on the predetermined distance to the location at which the first image is photographed, and then, a second image is photographed, and then, the calibration part calibrates the predetermined distance such that the second image matches with the first image.

Further, the scanning apparatus is characterized by comprising a first specimen piece on which a first tip-conditioning specimen for cleaning the first AFM probe is placed and a second specimen piece on which a second tip-conditioning specimen for cleaning the second AFM probe is placed, wherein the first specimen piece and the second specimen piece are positioned at a left side and a right side of the specimen piece respectively, with the specimen piece being at a center.

Further, the first AFM probe and the second AFM probe are characterized by being respectively moved to the first specimen piece or the second specimen piece so that a cleaning process through the first tip-conditioning specimen or the second tip-conditioning specimen is performed, when a quality of an image measured from the first AFM probe or the second AFM probe falls below a predetermined resolution.

Further, a scanning method using plural AFM probes comprises placing a nano structure to be measured on a specimen piece, measuring a location and a shape of the nano structure on the specimen piece using a first AFM probe of plural AFM probes having different resolutions, and measuring a three-dimensional shape of the nano structure using a second AFM probe of the plural AFM probes.

Further, said measuring the location and the shape is characterized by comprising scanning the specimen piece using the first AFM probe to select the nano structure, rotating the nano structure in a requested direction or adjusting a binding molecule layer supporting the nano structure, and re-scanning the nano structure to measure the location and the shape of the nano structure.

Further, said adjusting the molecule layer is characterized by comprising irradiating a laser with a particular wavelength corresponding to an electronic excitation energy or a vibration frequency of binding molecules which constitute the binding molecule layer to selectively remove the binding molecule layer on a molecule layer basis.

Further, the laser is characterized by being irradiated from a laser irradiation apparatus positioned outside of the first AFM probe, or positioned inside of the first AFM probe as being provided in a form of a near-field scanning optical microscope.

Further, said measuring the three-dimensional shape is characterized by comprising scanning the nano structure in an atomic resolution using the second AFM probe to measure the three-dimensional shape of the nano structure.

Further, the scanning method is characterized by further comprising performing calibration of a relative position between the first AFM probe and the second AFM probe prior to an actual measurement on the nano structure.

Further, said performing calibration is characterized by comprising measuring a particular location of the nano structure with the first AFM probe to photograph a first image to be a reference, moving the second AFM probe, based on a predetermined distance between the first AFM probe and the second AFM probe, to the location at which the first image is photographed, photographing a second image with the second AFM probe at the location the second AFM probe is moved, and performing calibration of the predetermined distance such that the second image matches with the first image.

Further, the scanning method is characterized by further comprising performing a cleaning for the corresponding AFM probe when a quality of an image measured from the first AFM probe or the second AFM probe falls below a predetermined resolution.

Further, said performing the cleaning is characterized by comprising cleaning the first AFM probe by moving it to a first specimen piece on which a first tip-conditioning specimen for cleaning the first AFM probe is placed, and cleaning the second AFM probe by moving it to a second specimen piece on which a second tip-conditioning specimen for cleaning the second AFM probe is placed.

Further, the first specimen piece and the second specimen piece are characterized by being disposed at a left side and a right side of the specimen piece on which the nano structure is placed, the first AFM probe and the second AFM probe being respectively movable by a motor to approach the first specimen piece or the second specimen piece.

Further, the first AFM probe is characterized by having a high resolution and the second AFM probe is characterized by having an atomic resolution.

According to the disclosure, AFM probes with different resolutions are implemented on an apparatus for scanning an independent nano structure, and the apparatus identifies the location and the shape of the nano structure on a specimen piece using a high resolution AFM probe, and then measures a three-dimensional shape of the identified nano structure using an atomic resolution AFM probe. Thereby, more precise measurement on a nano structure is achieved.

BRIEF DESCRIPTION OF THE DRAWINGS

FIG. 19 is a control flow chart of an AFM measurement operation at an apparatus for scanning a nano structure with plural AFM probes in accordance with one embodiment.

DESCRIPTION OF EMBODIMENTS

Hereinafter, the principles of the operations are described with reference to the accompanying drawings. Detailed descriptions on the well-known functions or structures may be omitted when it is determined that they may unnecessarily obscure the substance. Further, the terms used hereinafter are defined considering how they are used in the disclosure. It is apparent that their definitions may vary depending on the intention, custom, etc. of a user, an operator, or the like. Accordingly, their definitions should be based on the teachings described throughout the disclosure.

Figure 1:
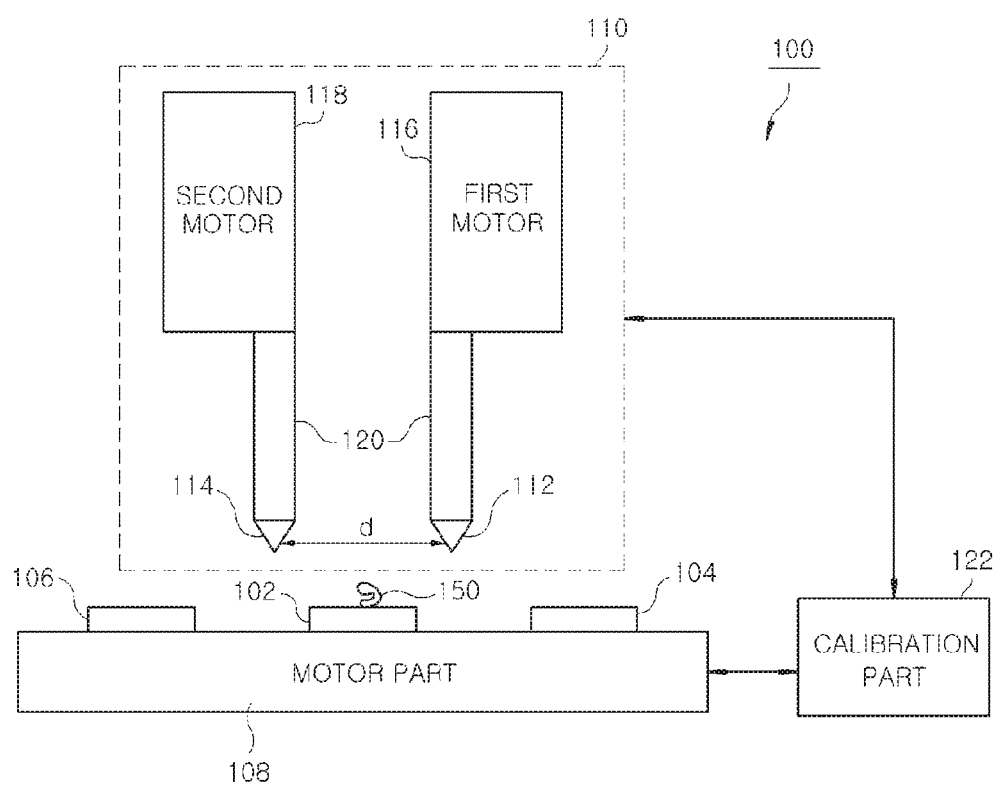
FIG. 1 is a detailed block diagram of an apparatus for scanning a nano structure with plural AFM probes in accordance with one embodiment.

FIG. 1 illustrates a detailed block configuration of an apparatus for scanning an independent nano structure having plural AFM probes in accordance with one embodiment, which may include a specimen piece 102, a motor part 108, a probe part 110, and a calibration part 122.

Described below are the operations at each element of the scanning apparatus 100 with reference to FIG. 1.

For first, the specimen piece 102 is an object on which a nano structure 150 for measurement is placed, and can be formed at a certain area on the motor part 108 that can move the specimen 102 in a horizontal (X, Y) direction.

Further, a first specimen piece 104, for cleaning a first AFM probe 112, having a high resolution, and a second specimen piece 106, for cleaning a second AFM probe 114, having an atomic resolution, may be positioned in parallel at the left and right sides of the specimen 102, but not limited thereto. In addition, the nano structure 150 such as an independent nano structure for measurement by using an AFM probe may be placed on the top of the specimen 102.

Further, the first specimen piece 104 refers to a specimen piece on which a specimen for keeping the first AFM probe 112 to have a high resolution is placed, where the specimen may be, for example, gold (Au). Further, the second specimen piece 106 refers to a specimen piece on which a specimen for keeping the second AFM probe 114 to have an atomic resolution is placed, where the specimen may be, for example, copper (Cu) on which carbon monoxide (CO) molecule is deposited.

The motor part 108 is an apparatus, installed under the specimen 102, the first specimen 104, and the second specimen 106, for moving the specimen 102, the first specimen 104, and the second specimen 106 in a horizontal (X, Y) direction during the AFM measurement operation to allow each specimen piece to be positioned under the first AFM probe 112 or the second AFM probe 114, and may include therein a position sensor (not shown) for measuring the position of the first AFM probe 112 and the second AFM probe 114 of the probe part 110 on the basis of the specimen 102.

Figure 2:
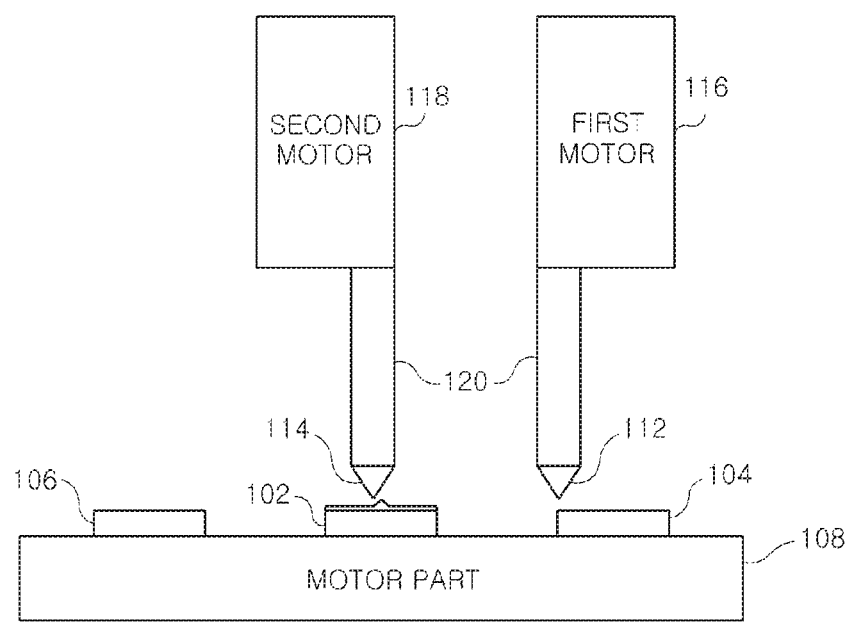
FIG. 2 is a detailed block diagram of an apparatus for scanning a nano structure with plural AFM probes in accordance with another embodiment.

Further, although the motor part 108 is exemplarily described in FIG. 1 as being installed under the specimen 102, the first specimen 104, and the second specimen 106, it may also be installed such that it is coupled to the first AFM probe 112 and the second AFM probe 114, as shown in FIG. 2, to move the first AFM probe 112 and the second AFM probe 114 above each specimen during the AFM measurement operation.

The probe part 110 may have plural AFM probes with different resolutions for measuring the nano structure 150 placed on the specimen piece 102, and may perform measurements on a three-dimensional shape of the nano structure 150 using the plural AFM probes.

As describe above, the probe part 110 may comprise the first AFM probe 112 having a high resolution and the second AFM probe 114 having an atomic resolution, and may measure a location and a shape of the nano structure 150 on the specimen piece 102 with the first AFM probe 112 and measure a three-dimensional shape of the nano structure 150 with the second AFM probe 114, but is not limited thereto. In this embodiment, the first AFM probe 112 and the second AFM probe 114 are moved together while being spaced by a predetermined first distance d.

Further, the probe part 110 may have a first motor (z motor) 116 and a second motor 118 for moving the first AFM probe 112 or the second AFM probe 114 in a vertical direction. The first motor 116 and the second motor 118 lift up or lower down the first AFM probe 112 or the second AFM probe 114 from the top of the first specimen piece 104 or the second specimen piece 106 toward each specimen piece, and, when measuring the nano structure 150, they move the first AFM probe 112 or the second AFM probe 112 from above the specimen 102 to a predetermined height required for measuring the nano structure 150.

Further, the probe part 110 may have a scanner 120 coupled to each of the first AFM probe 112 and the second AFM probe 112. The scanner 102 generates a scanned image of the nano structure 150 measured through the first AFM probe 112 and the second AFM probe 114.

The calibration part 122 performs calibration of a relative position between the first AFM probe 112 and the second AFM probe 114 prior to an actual measurement on the nano structure 150 using the second AFM probe 114. For example, an error may occur in the actual measurement on the predetermined first distance d between the first AFM probe 112 and the second AFM probe 114, and the calibration part 122 measures an error value occurring in the first distance d and compensates the error before the actual measurement using the second AFM probe 114 to enable more precise measurement.

Figure 15:
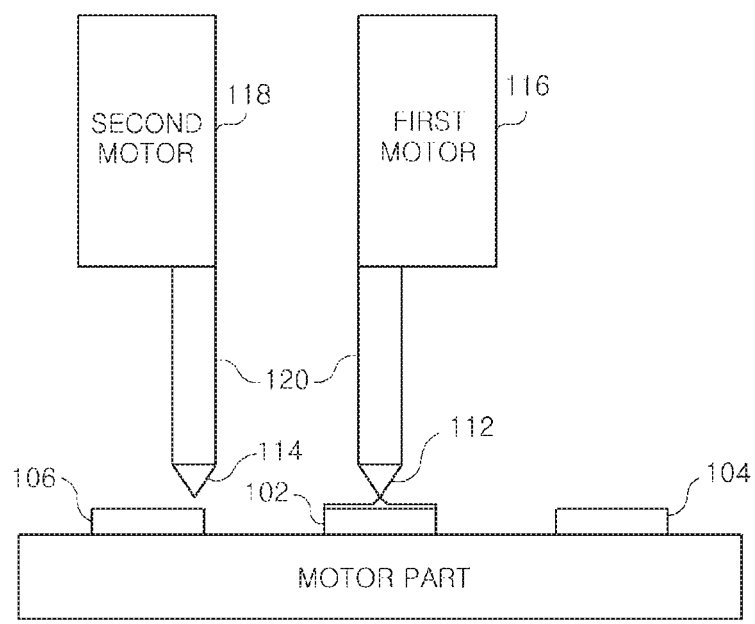
FIGS. 15 and 16 are exemplary diagrams of a process of calibrating a relative position between plural AFM probes using a position sensor in a motor part in accordance with one embodiment.
Figure 16:
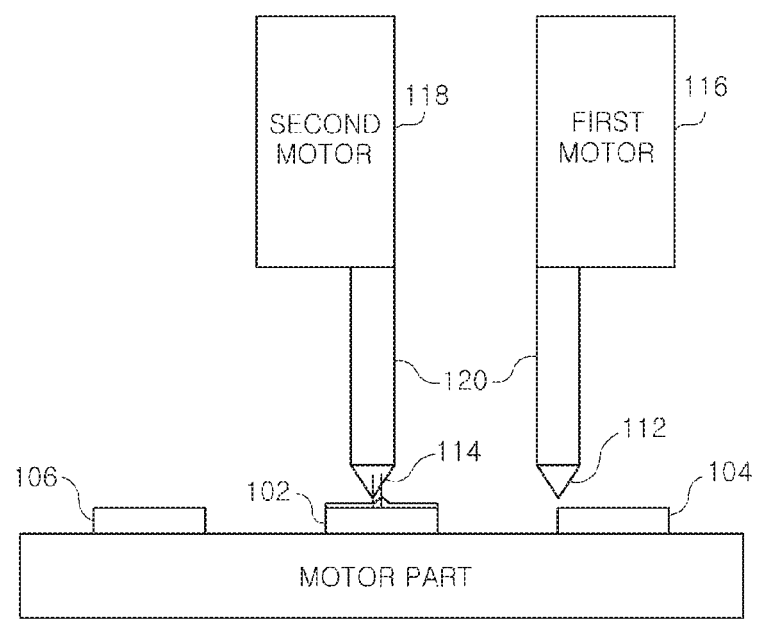

In performing calibration, for example, the calibration part 122 may perform calibration by measuring a particular location with the first AFM probe 112 to determine a first image to be a reference image as shown in FIG. 15, and moving the second AFM probe 114 to the location at which the first image is determined based on the first distance d, which is the spacing distance between the first AFM probe 112 and the second AFM probe 114, to photograph a second image as shown in FIG. 16, and then, compensating an error in the first distance d such that the second image becomes a same image as the first image.

Hereinafter, AFM measurement operations such as measurement on a three dimensional shape of the nano structure 150 such as an independent nano structure using plural AFM probes are described in more details.

Figure 3:
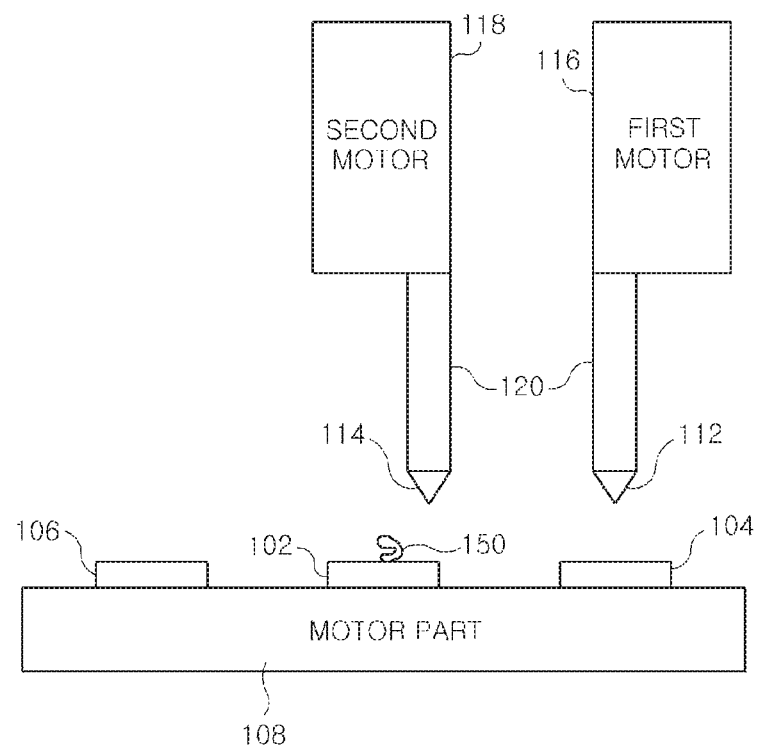
FIGS. 3-6 are exemplary diagrams of a process of measuring the location and the shape of a nano structure and cleaning a high resolution AFM probe in accordance with one embodiment.

When an AFM measurement on the nano structure 150 is initiated, the first AFM probe 112 in the probe part 110 may be moved toward the first specimen piece 104 as shown in FIG. 3. In moving the first AFM probe 112 to the location of the first specimen piece 104, the first specimen piece 104 may be moved by use of the motor part 108 moving the specimen piece 102, the first specimen piece 104, and the second specimen 106 in a horizontal (X, Y) direction. In another embodiment when the motor part 108 is coupled to the probe part 110 as shown in FIG. 2, a movement may be implemented by moving the probe part 110 by use of the motor part 108.

Figure 4:
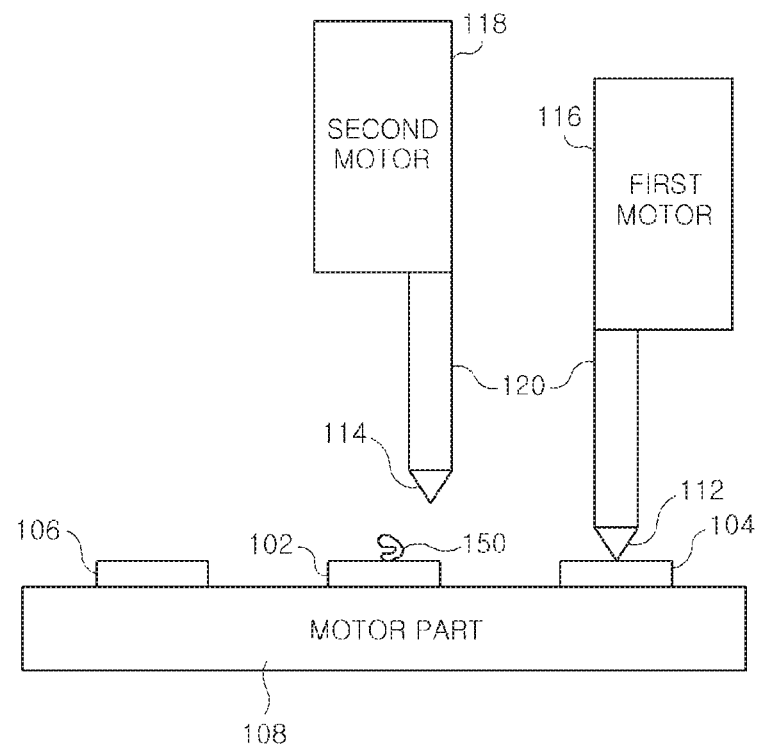

Subsequently, as shown in FIG. 4, the first AFM probe 112 is lowered to the first specimen piece 104 by the first motor 116 to be cleaned in a high resolution through the first specimen piece 104.

Figure 5:
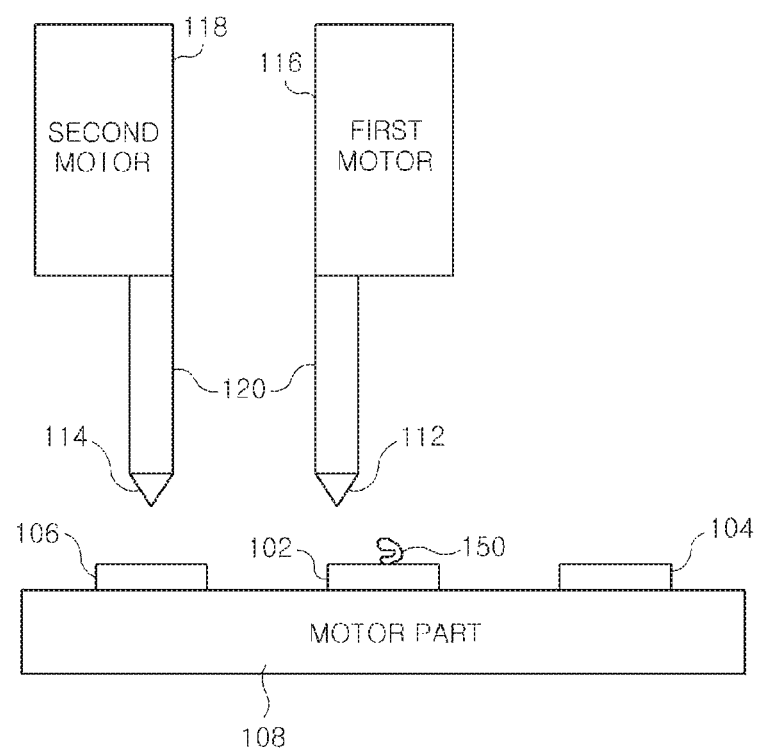
Figure 6:
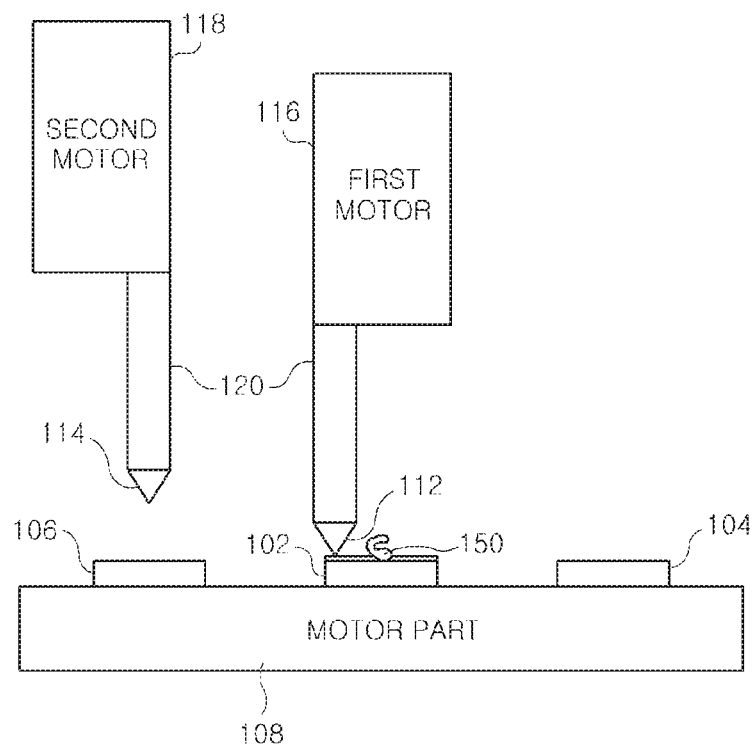

After the cleaning is performed as above, the first AFM probe 112 is moved to the specimen piece 102 on which the nano structure 150 is placed as shown in FIG. 5, and then is lowered to the specimen piece 102 to select the nano structure 150 while scanning the specimen piece 102. Further, it re-scans the nano structure 150 to measure the location and the shape of the nano structure 150 on the specimen piece 102 while rotating the nano structure 150 in a requested direction or adjusting a binding molecule layer supporting the nano structure 150.

Figure 7A:
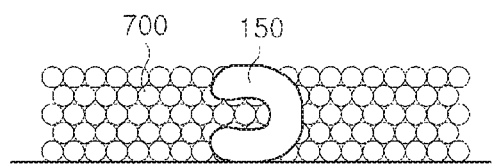
FIGS. 7A and 7B are exemplary diagrams of a binding molecule layer in accordance with one embodiment.
Figure 7B:
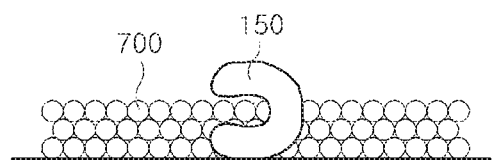

In this embodiment, a binding molecule layer 700 refers to a multi-layered micro molecule layer grown around the nano structure 150 to fix the nano structure 150 such as an independent nano structure. For example, the binding molecule layer 700 may be formed in a multi-layer around the nano structure 150 as shown in FIG. 7A, and, when adjusting the binding molecule layer 700, it may be removed on a molecule layer basis as shown in FIG. 7B.

Figure 8:
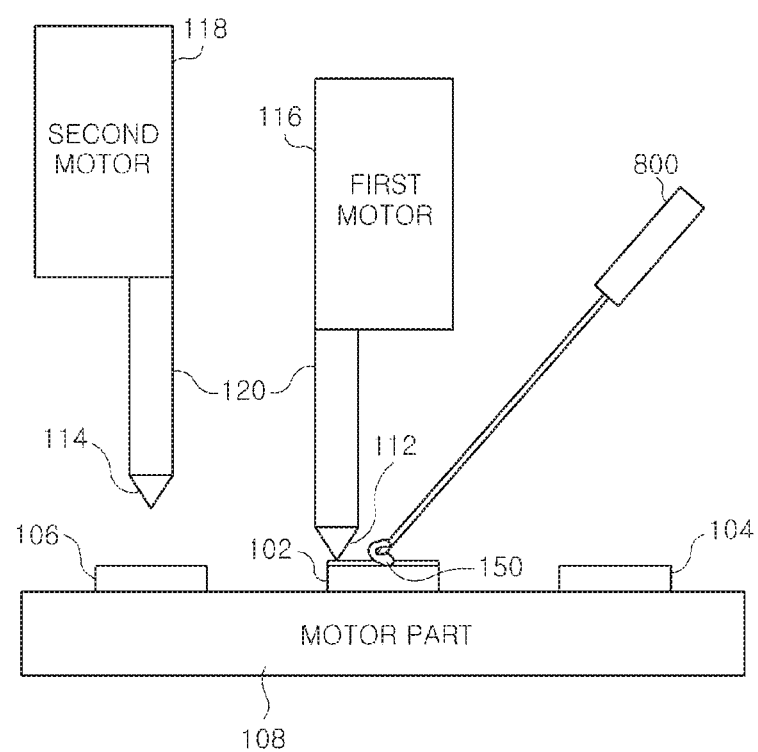
FIGS. 8 and 9 are exemplary configuration diagrams of a laser irradiation apparatus for adjusting a binding molecule layer in accordance with embodiments.
Figure 9:
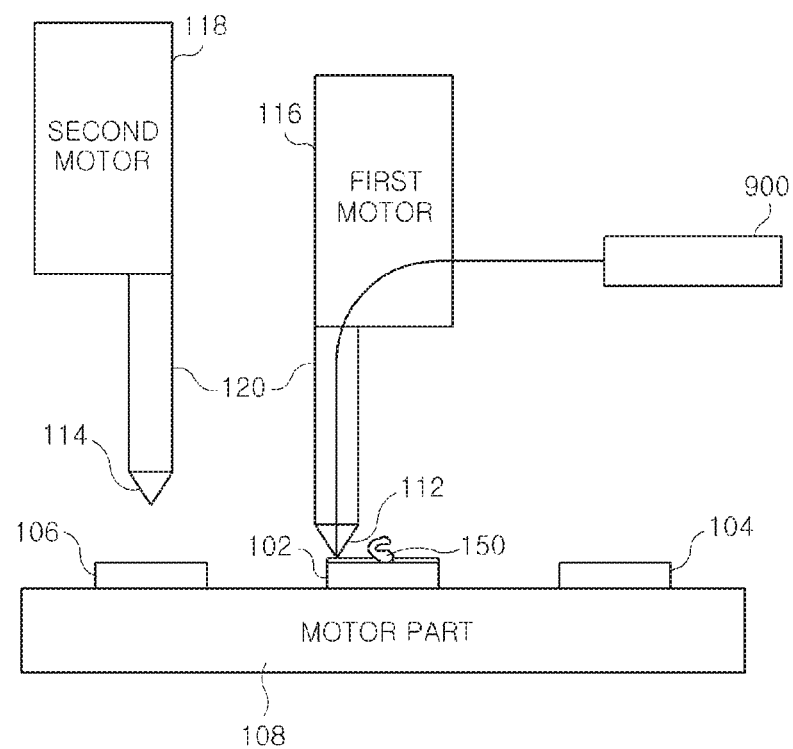

In this embodiment, the probe part 110 may be an apparatus for adjusting the binding molecule layer 700 as above, and may be equipped with a laser irradiation apparatus 800 or 900 as illustrated in FIGS. 8 and 9.

FIG. 8 illustrates an embodiment where the laser irradiation apparatus 800 is positioned outside the first AFM probe 112, and FIG. 9 illustrates an embodiment where the laser irradiation apparatus 900, provided in a form of a near-field scanning optical microscope, is positioned inside the first AFM probe 112.

The laser irradiation apparatus 800 or 900 performs adjustment of the binding molecule layer 700 when the first AFM probe performs measurement on the location and the shape of the nano structure 150.

That is, the laser irradiation apparatus 800 or 900 irradiates to the binding molecule layer 700 a laser with a particular wavelength corresponding to an electronic excitation energy or a vibration frequency of the binding molecules to selectively remove the binding molecule layer 700 on a molecule layer bases.

Figure 10:
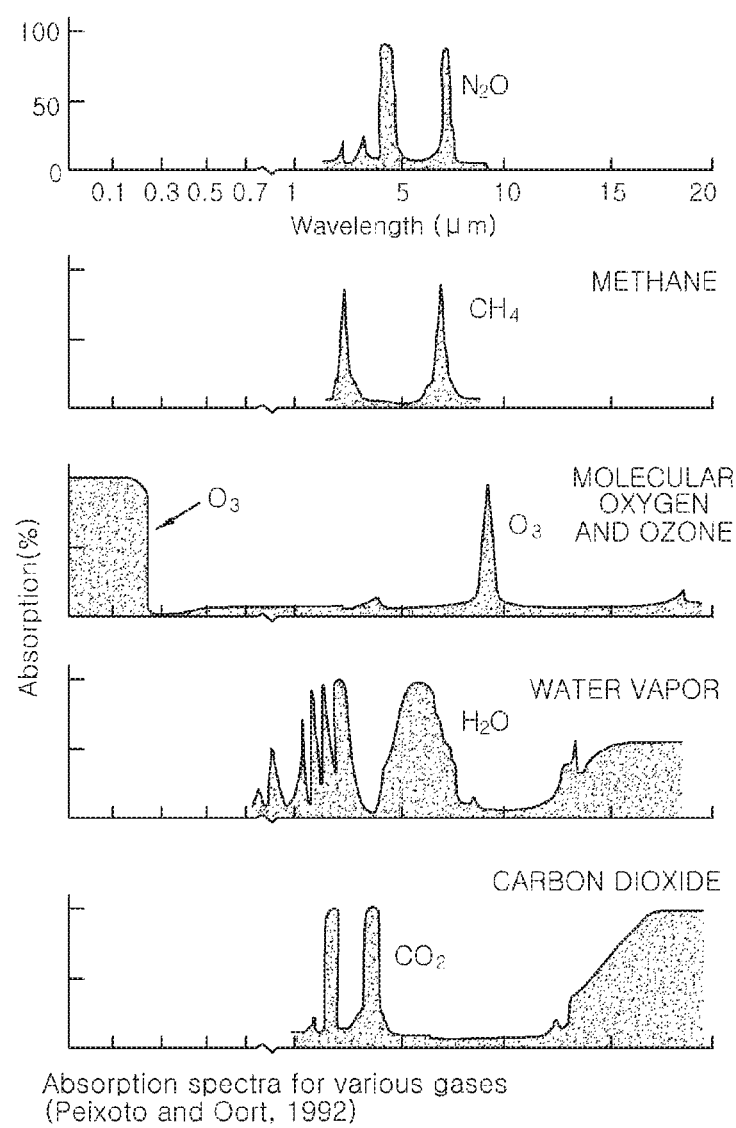
FIG. 10 is an exemplary graph of the absorption rates of binding molecule layers per wavelength in accordance with one embodiment.

In selecting a particular wavelength, a wave length of the laser such that binding molecules have the largest absorption rate may be selected with reference to an absorption rate graph of binding molecules according to the wavelength of the laser as shown in FIG. 10. As a laser with a particular wavelength is used, the binding molecules attached on or around the nano structure 150 may be selectively removed on a molecule layer basis at an ultralow temperature without changing the entire temperature of the nano structure 150.

Figure 11:
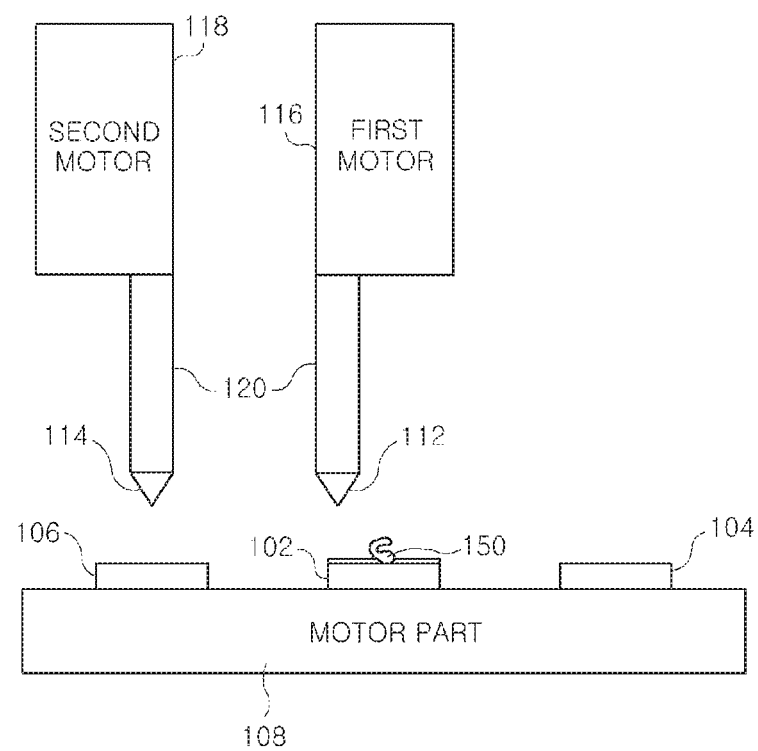
FIGS. 11-14 are exemplary diagrams of a process of measuring a three-dimensional shape of a nano structure and cleaning an atomic resolution AFM probe in accordance with one embodiment.

Subsequently, when the measurement by the first AFM probe 112 on the location and the shape of the nano structure 150 is finished, the second AFM 114 is moved towards the second specimen piece 106 as shown in FIG. 11.

Figure 12:
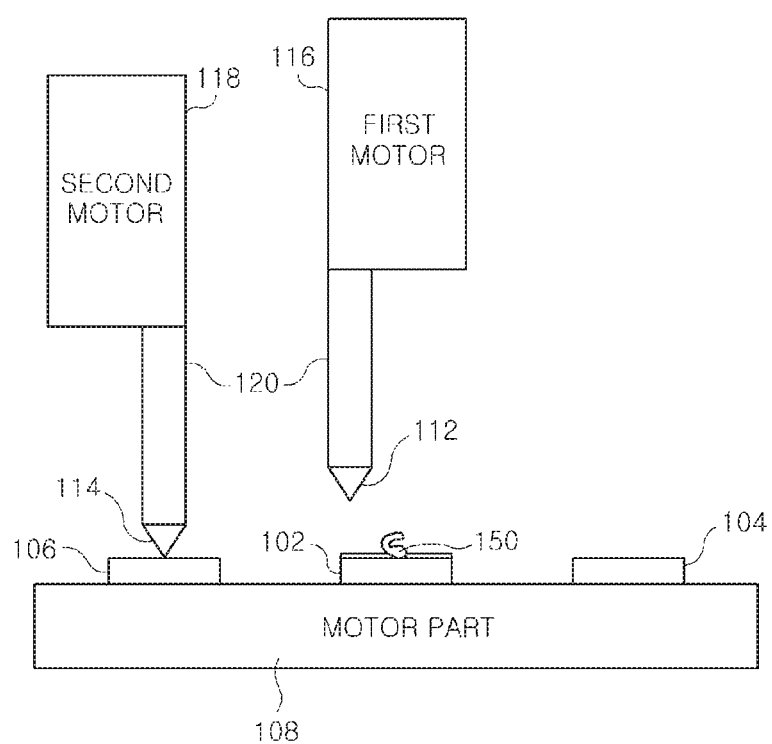

Next, the second AFM probe 114 in the probe part 110 is lowered to the second specimen piece 106 by the second motor 118 and is cleaned in an atomic resolution through the second specimen piece 106 as shown in FIG. 12.

Figure 13:
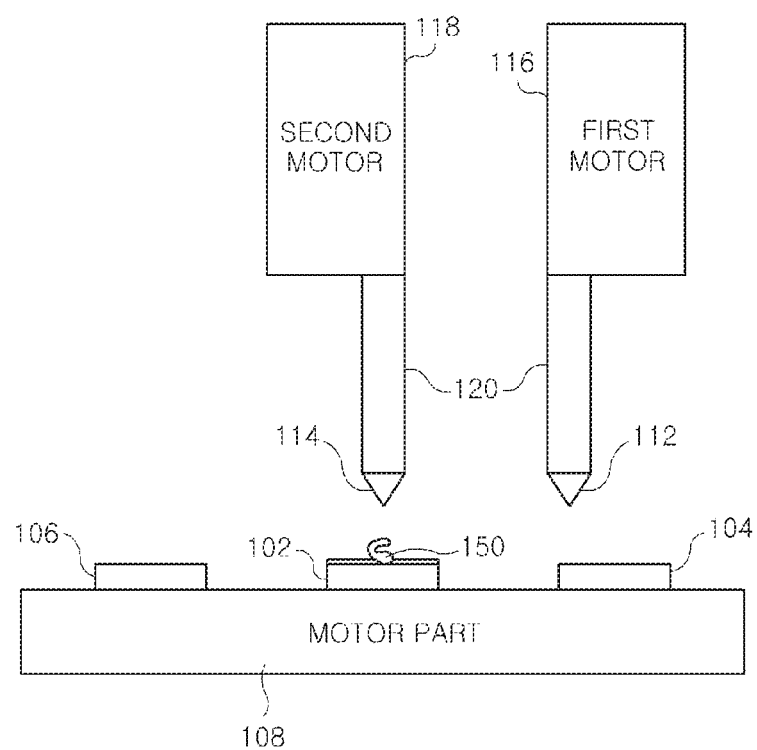

After the cleaning is performed as above, the second AFM probe 114 is moved to the specimen piece 102 on which the nano structure 150 is placed as shown in FIG. 13 and then the second AFM probe 114 is lowered by the second motor 118 to the specimen piece 102 on which the nano structure 150 is placed and scans the nano structure 150 in an atomic resolution to measure a three dimensional shape of the nano structure 150. Here, the second AFM probe 114 is moved to the location of the nano structure 150 on the specimen piece 102 identified by the first AFM probe 112, and then is lowered to a predetermined height for measurement on the nano structure 150 to be able to scan the nano structure 150.

Accordingly, it becomes possible to measure more precisely an independent nano structure by first selecting the nano structure 150 on the specimen piece 102 with the first AFM probe 112 in a high resolution and identifying an approximate shape of the nano structure 150 through operations such as rotating the nano structure 150, and then, measuring the three dimensional shape of the nano structure 150 with the second AFM probe 114 in an atomic resolution.

In this embodiment, the first AFM probe 112 and the second AFM probe 114 as above may be regularly inspected for the states of their resolutions, and when it is determined that each AFM probe has a resolution below a predetermined reference resolution so that it is difficult to provide precise measurement, the cleaning operation as shown in FIG. 4 or 12 may be performed thereto so that the resolution of each AFM probe is kept in a good state.

Further, in moving the second AFM probe 114 to the location of the nano structure 150 identified by the first AFM probe 112, the position information identified through the position sensor embedded in the motor part 108 may be utilized when the first AFM probe 112 performs the selection operation of the nano structure 150, or a high magnification microscope 950 may be utilized to locate an approximate location of the nano structure 150 and then the location of the nano structure 150 may be confirmed through an actual scan using the second AFM probe 114.

That is, in case of using the high magnification microscope 950, the approximate location may be located through positioning the second AFM probe 114 at the same position of the nano structure 150 while verifying with the high magnification microscope 950 whether the second AFM probe 114 is positioned at the same position of the nano structure 150, and then, scanning the nano structure 150 with the second AFM probe 114 to verify whether the position of the reference shape is exactly on the estimated location.

Figure 17:
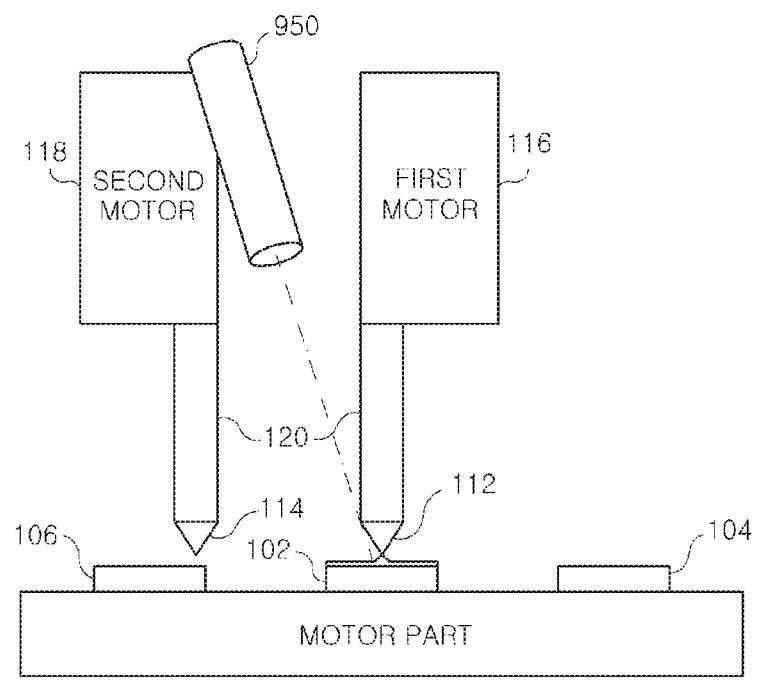
FIGS. 17 and 18 are exemplary diagrams of a process of calibrating a relative position between plural AFM probes using an optical microscope in accordance with one embodiment.
Figure 18:
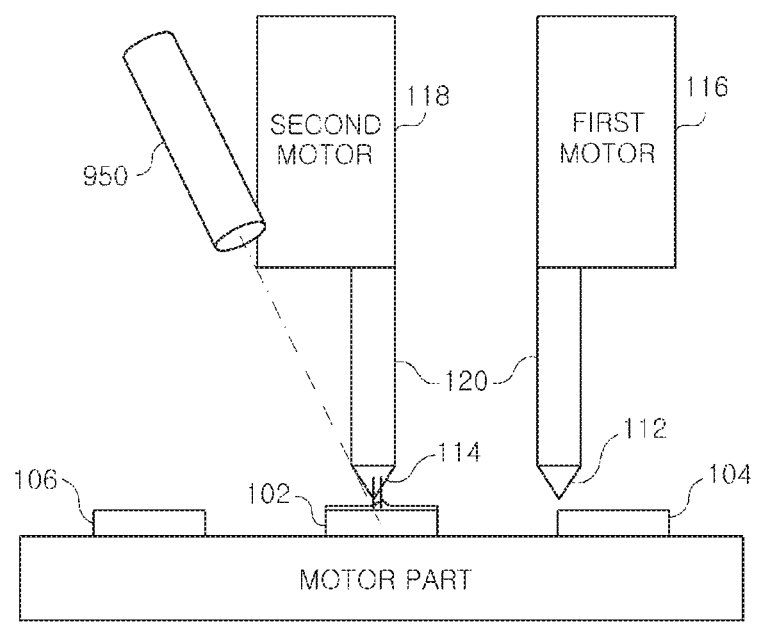

In more details, in moving the second AFM probe 114, the probe part 110, for example, may photograph the first location relation image between the first AFM probe 112 and the nano structure 150 using the optical microscope 950 as provided in FIG. 17, and then, the second location relation image between the second AFM 114 and the nano structure 150 may be photographed while moving the second AFM probe 114 towards the nano structure 150 as shown in FIG. 18 and thereby the second AFM probe 114 may be moved to the location at which the second location relation image matches the first location relation image. In this embodiment, after moving the second AFM probe 114 in an optical resolution basis as above, it may be verified whether the position of a particular reference image scanned through the second AFM probe 114 is exactly on the estimated location, and if there is an error, calibration may be performed by correcting the estimated value.

FIG. 19 illustrates a control flow of an AFM measurement operation for a nano structure at an apparatus for scanning a nano structure with plural AFM probes in accordance with one embodiment. Hereinafter, embodiments are described in detail with reference to FIGS. 1-19.

For first, the nano structure 150 for measurement such as a nano structure may be placed on the specimen piece 102 (S100).

In case where the nano structure 150 is placed as described above, the scanning apparatus 100 controls the motor part 108 to move the first AFM probe 112 towards the first specimen piece 104 as shown in FIG. 3.

Next, the first motor 116 is controlled to lower the first AFM probe 112 on the first specimen piece 104 and clean the first AFM probe 112 through the first specimen piece 104 in a high resolution as shown in FIG. 4 (S102).

When the cleaning of the first AFM probe 112 is finished, the scanning apparatus 100 moves the cleaned first AFM probe 112 to the specimen piece 102 on which the nano structure 150 is placed as shown in FIG. 5 (S104), and then, lowers the first AFM probe 112 by the first motor 116 to the specimen piece 102 on which the nano structure 150 is placed and selects the nano structure 150 while scanning the specimen piece 102 through the first AFM probe 112 (S106).

Subsequently, when the nano structure 150 on the specimen piece 102 is selected through the scanning, the nano structure 150 is re-scanned while adjusting the binding molecule layer 700 supporting the nano structure 150 or rotating the nano structure 150 in a required direction using the first AFM probe 112 to measure the location and the shape of the nano structure 150 (S108).

In adjusting the binding molecule layer 700, the scanning apparatus 100, for example, may irradiate a laser with a particular wavelength through the laser irradiation apparatus 800 or 900 to the binding molecule layer 700, which is a multi-layered micro molecule layer fixed around the nano structure 150 as shown in FIG. 7A, so as to remove the binding molecule layer 700 on a molecule layer basis as shown in FIG. 7B.

When the measurement with the first AFM probe 112 on the location of the nano structure 150 on the specimen piece 102 and the shape of the nano structure 150 as above, the scanning apparatus 100 lowers the second AFM probe 114 on the second specimen piece 106 by the second motor 118 to be cleaned through the second specimen piece 106 in an atomic resolution as show in FIG. 12 (S110).

Figure 14:
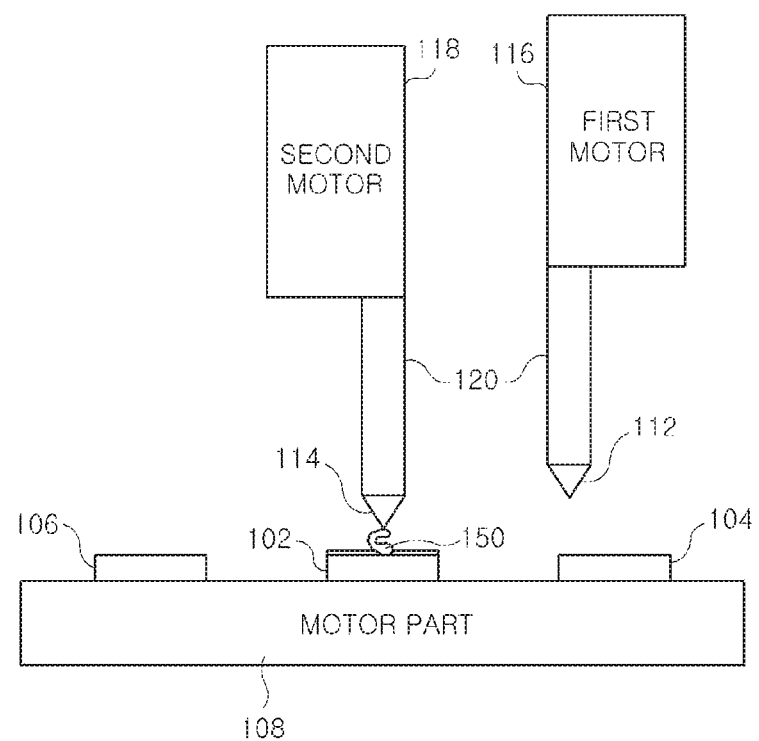

Subsequently, when the cleaning of the second AFM probe 114 is finished, the scanning apparatus 100 moves the second AFM probe 114 as cleaned to the identified location of the nano structure 150 on the specimen piece 102 on which the nano structure 150 is placed as shown in FIG. 13, and then, lowers the second AFM probe 114 by the second motor 118 towards the specimen piece 102 on which the nano structure is placed as shown in FIG. 14 (S112).

In lowering the second AFM probe 114, the scanning apparatus may lower it to a predetermined height for measuring the nano structure 150 so that it is possible to scan the nano structure 150.

Subsequently, the scanning apparatus 100 may scan the nano structure 150 such as an independent nano structure in an atomic resolution using the second AFM probe 114 (S114) so that it may measure a three-dimensional shape of the nano structure 150 (S116).

Accordingly, it becomes possible to measure more precisely an independent nano structure by first selecting the nano structure 150 on the specimen piece 102 with the first AFM probe 112 in a high resolution and identifying an approximate shape of the nano structure 150 through operations such as rotating the nano structure 150, and then, measuring the three dimensional shape of the nano structure 150 by use of the second AFM probe 114 in an atomic resolution.

As described above, an apparatus implemented for scanning an independent nano structure having plural AFM probes with different resolutions, identifies the location on the specimen piece and the shape of a nano structure using high resolution AFM probes, and then, measures the three-dimensional shape of the identified nano structure through the scanning using atomic resolution AFM probes, and thereby enables more precise measurement on a nano structure.

Although the disclosure describes specific embodiments, various modifications may be made without departing from the subject matter of the disclosure. Therefore, the scope of the disclosure must not be limited to the embodiments as described above, but must be construed by the following claims.

The invention claimed is:

1. An apparatus for scanning a nano structure with plural AFM probes comprising:
   a specimen piece on which a nano structure is placed;
   a probe part having plural AFM probes with different resolutions; and
   a motor part, being coupled to the specimen piece or the probe part, for moving the specimen piece or the plural AFM probes in a horizontal direction.

2. The apparatus for scanning a nano structure with plural AFM probes of claim 1, wherein the probe part comprises:
   a first AFM probe for performing a first measurement on the nano structure to measure a location and a shape of the nano structure on the specimen piece, and
   a second AFM probe, being spaced from the first AFM probe by a predetermined distance, for performing a second measurement on the nano structure to measure a three-dimensional shape of the nano structure.

3. The apparatus for scanning a nano structure with plural AFM probes of claim 2, wherein the probe part scans the specimen piece using the first AFM probe to select the nano structure, and re-scans the nano structure while rotating the nano structure in a requested direction or adjusting thickness and smoothness of a binding molecule layer supporting the nano structure to measure the location and the shape of the nano structure.

4. The apparatus for scanning a nano structure with plural AFM probes of claim 3, wherein when adjusting thickness and smoothness of the the binding molecule layer, the probe part irradiates, through a laser irradiation apparatus, a laser with a particular wavelength corresponding to an electronic excitation energy or a vibration frequency of binding molecules which constitute the binding molecule layer to selectively remove the binding molecule layer on a molecule layer basis.

5. The apparatus for scanning a nano structure with plural AFM probes of claim 2, wherein when identifying the location and the shape of the nano structure through the first AFM probe, the probe part is configured to move the second AFM probe to the location of the nano structure, and scan the nano structure in an atomic resolution using the second AFM probe to measure the three-dimensional shape of the nano structure.

6. The apparatus for scanning a nano structure with plural AFM probes of claim 5, wherein in moving the second AFM probe to the location of the nano structure, the probe part is configured to move the second AFM probe to a location at which a second location relation image matches with a first location relation image, and
wherein the first location relation image between the first AFM probe and the nano structure is photographed by an optical microscope, and thereafter, second location relation image between the second AFM probe and the nano structure is photographed by the optical microscope while approaching the second AFM probe to the nano structure.

7. The apparatus for scanning a nano structure with plural AFM probes of claim 2, wherein the probe part further comprises a first motor for moving the first AFM probe in a vertical direction and a second motor for moving the second AFM probe in a vertical direction, and
wherein when performing the first measurement or the second measurement, the probe part respectively moves the first AFM probe or the second AFM probe through the first motor or the second motor from above the specimen piece to a predetermined height required for measuring the nano structure.

8. The apparatus for scanning a nano structure with plural AFM probes of claim 2, wherein the probe part further comprises a scanner coupled to each of the first AFM probe and the second AFM probe, for generating a scanned image of the nano structure measured through the first AFM probe and the second AFM probe.

9. The apparatus for scanning a nano structure with plural AFM probes of claim 2, further comprising a calibration part for performing calibration of a relative position between the first AFM probe and the second AFM probe prior to an actual measurement on the nano structure.

10. The apparatus for scanning a nano structure with plural AFM probes of claim 2, further comprising:
a first specimen piece on which a first tip-conditioning specimen for cleaning the first AFM probe is placed; and
a second specimen piece on which a second tip-conditioning specimen for cleaning the second AFM probe is placed,
wherein the first specimen piece and the second specimen piece are positioned at a left side and a right side of the specimen piece respectively, with the specimen piece being at a center.

11. A scanning method using plural AFM probes comprising:
placing a nano structure to be measured on a specimen piece;
measuring a location and a shape of the nano structure on the specimen piece using a first AFM probe of the plural AFM probes having different resolutions; and
measuring a three-dimensional shape of the nano structure using a second AFM probe of the plural AFM probes.

12. The scanning method using plural AFM probes of claim 11, wherein said measuring the location and the shape comprises:
scanning the specimen piece using the first AFM probe to select the nano structure, and
rotating the nano structure in a requested direction or adjusting thickness and smoothness of a binding molecule layer supporting the nano structure.

13. The scanning method using plural AFM probes of claim 12, wherein said adjusting the molecule layer comprises irradiating a laser with a particular wavelength corresponding to an electronic excitation energy or a vibration frequency of binding molecules which constitute the binding molecule layer to selectively remove the binding molecule layer on a molecule layer basis.

14. The scanning method using plural AFM probes of claim 11, wherein said measuring the three-dimensional shape comprises scanning the nano structure in an atomic resolution using the second AFM probe to measure the three-dimensional shape of the nano structure.

15. The scanning method using plural AFM probes of claim 11, further comprising performing calibration of a relative position between the first AFM probe and the second AFM probe prior to an actual measurement on the nano structure.

16. The scanning method using plural AFM probes of claim 11, wherein said performing calibration comprises:
measuring a particular location of the nano structure with the first AFM probe to photograph a first image to be a reference,
moving the second AFM probe to the location at which the first image is photographed based on a predetermined distance between the first AFM probe and the second AFM probe,
photographing a second image with the second AFM probe at the location the second AFM probe is moved, and
performing calibration of the predetermined distance such that the second image matches with the first image.

17. The scanning method using plural AFM probes of claim 11, further comprising:
performing a cleaning for the first AFM probe or the second AFM probe when a quality of an image measured from the first AFM probe or the second AFM probe falls below a predetermined resolution.

18. The scanning method using plural AFM probes of claim 17, wherein said performing the cleaning comprises:
cleaning the first AFM probe by moving the first AFM probe to a first specimen piece on which a first tip-conditioning specimen for cleaning the first AFM probe is placed, and
cleaning the second AFM probe by moving the second AFM probe to a second specimen piece on which a second tip-conditioning specimen for cleaning the second AFM probe is placed.

19. The scanning method using plural AFM probes of claim 17, wherein the first specimen piece and the second specimen piece are respectively disposed at a left side and a right side of the specimen piece on which the nano structure is placed, the first AFM probe and the second AFM probe being respectively movable by a motor to approach the first specimen piece or the second specimen piece.

* * * * *